(12) United States Patent
Rintelmann et al.

(10) Patent No.: US 9,797,428 B2
(45) Date of Patent: Oct. 24, 2017

(54) CONNECTION BETWEEN TWO COMPONENTS MADE OF REINFORCED PLASTIC AND METHOD FOR THE PRODUCTION THEREOF

(75) Inventors: Jochen Rintelmann, Dessau-Rosslau (DE); Michael Stumpf, Bielefeld (DE); Carsten Bär, Ingolstadt (DE); Torsten Draht, Schloss Holte (DE); Marc Steinig, Altenbeken (DE)

(73) Assignees: Böllhoff Verbindungstechnik GmbH (DE); Audi AG (DE)

(*) Notice: Subject to any disclaimer, the term of this patent is extended or adjusted under 35 U.S.C. 154(b) by 334 days.

(21) Appl. No.: 13/500,253

(22) PCT Filed: Oct. 6, 2010

(86) PCT No.: PCT/EP2010/006109
§ 371 (c)(1),
(2), (4) Date: Aug. 27, 2012

(87) PCT Pub. No.: WO2011/042176
PCT Pub. Date: Apr. 14, 2011

(65) Prior Publication Data
US 2013/0000101 A1     Jan. 3, 2013

(30) Foreign Application Priority Data
Oct. 6, 2009  (DE) .................. 10 2009 048 398

(51) Int. Cl.
*F16B 19/06*  (2006.01)
*F16B 19/00*  (2006.01)
(Continued)

(52) U.S. Cl.
CPC ............. *F16B 19/00* (2013.01); *B21J 15/025* (2013.01); *B29C 65/562* (2013.01);
(Continued)

(58) Field of Classification Search
CPC .. F16B 5/04; F16B 19/04; F16B 19/05; F16B 19/08; F16B 19/083; F16B 19/086;
(Continued)

(56) References Cited

U.S. PATENT DOCUMENTS 1,421,033 A * 6/1922 Sinha ............................ 292/314
1,937,086 A * 11/1933 Kaplan ......................... 220/692
(Continued)

FOREIGN PATENT DOCUMENTS

CN         2519864 Y    11/2002
CN      101307791 A    11/2008
(Continued)

OTHER PUBLICATIONS

International Search Report/Written Opinion for PCT Application No. PCT/EP2010/006109; mailed Jan. 26, 2011; 8 pages.
(Continued)

*Primary Examiner* — Jun Yoo
(74) *Attorney, Agent, or Firm* — Barclay Damon, LLP

(57) ABSTRACT

The invention relates to a connection comprising at least two components having the following features: a first component and a second component, of which at least the second component comprises reinforced plastic, a self-piercing connection element (30) having a head and a shaft, the head thereof being supported on the first component and the shaft thereof running completely through the first and the second component, and a disc-shaped counter bearing to which the shaft is fastened such that the at least two components are fastened between the head and the counter bearing. The invention further relates to a method for the production of said connection.

7 Claims, 5 Drawing Sheets

Figure 1:
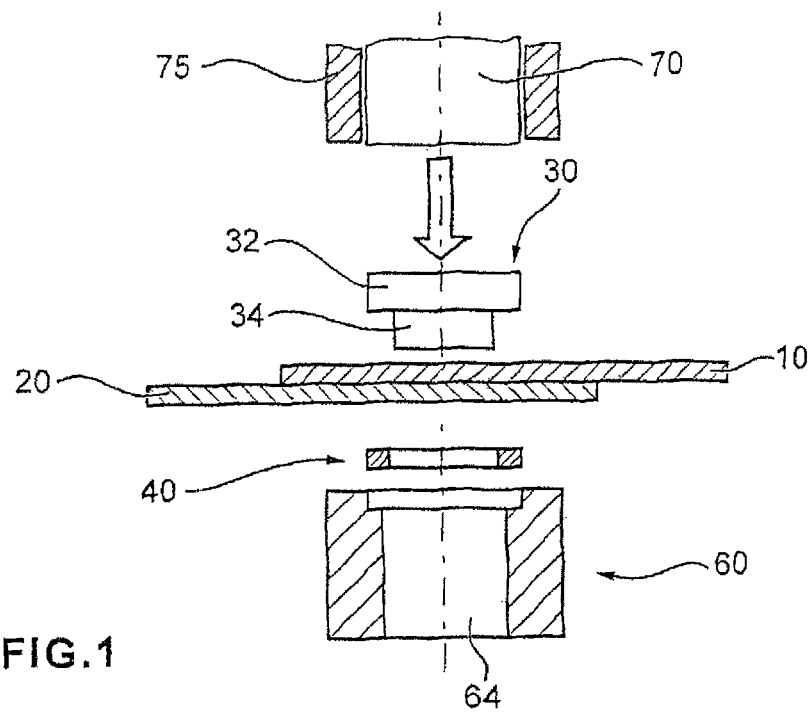

(51) Int. Cl.
*B21J 15/02* (2006.01)
*B29C 65/56* (2006.01)
*B29C 65/60* (2006.01)
*B29C 65/74* (2006.01)
*B29C 65/00* (2006.01)
*B29C 65/64* (2006.01)

(52) U.S. Cl.
CPC ........ *B29C 65/602* (2013.01); *B29C 65/7437* (2013.01); *B29C 66/1122* (2013.01); *B29C 66/21* (2013.01); *B29C 66/43* (2013.01); *B29C 66/721* (2013.01); *B29C 66/83221* (2013.01); *B29C 65/64* (2013.01); *B29C 66/7212* (2013.01); *B29C 66/742* (2013.01); *B29C 66/74283* (2013.01); *Y10T 29/4995* (2015.01)

(58) Field of Classification Search
CPC .. F16B 19/10; F16B 19/1027; F16B 19/1036; F16B 19/1045; F16B 19/1063; F16B 19/1072; B21J 15/00; B21J 15/02; B21J 15/022; B21J 15/025; B21J 15/04
USPC ............ 29/432.1, 432.2, 525.06, 524.1, 432; 411/501, 15; 156/92
See application file for complete search history.

(56) References Cited

U.S. PATENT DOCUMENTS

| | | |
|---|---|---|
| 2,464,622 A | 3/1949 | Veit |
| 2,482,391 A | 9/1949 | Webster |
| 3,733,958 A | 5/1973 | Willey |
| 3,909,913 A | 10/1975 | Tildesley |
| 4,687,398 A | 8/1987 | Berecz |
| 4,761,871 A * | 8/1988 | O'Connor et al. .......... 29/432.1 |
| 4,826,723 A * | 5/1989 | Brambach ................ B32B 5/24 156/214 |
| 4,978,270 A * | 12/1990 | Ackerman ............. B21J 15/025 29/520 |
| 5,359,765 A * | 11/1994 | Auriol .................... F16B 19/08 29/512 |
| 6,499,926 B2 | 12/2002 | Keener |
| 8,137,042 B2 * | 3/2012 | Severns ..................... 411/387.1 |
| 8,601,694 B2 * | 12/2013 | Brennan et al. ............. 29/897.2 |
| 2002/0172576 A1 | 11/2002 | Keener |
| 2004/0016111 A1 * | 1/2004 | Mueller ................ B23P 19/062 29/700 |
| 2007/0183865 A1 | 8/2007 | Severns |
| 2008/0222873 A1 | 9/2008 | Draht et al. |
| 2009/0070983 A1 | 3/2009 | Stumpf et al. |

FOREIGN PATENT DOCUMENTS

| | | | |
|---|---|---|---|
| CN | 101379305 A | 3/2009 | |
| DE | 27 07 291 A1 | 8/1978 | |
| DE | 30 16 499 A1 | 11/1980 | |
| DE | 100 15 239 A1 | 10/2001 | |
| DE | 103 23 740 A1 | 12/2004 | |
| DE | 20 2005 015 713 | 12/2005 | |
| DE | 102008017650 A1 * | 11/2009 | ............. B21J 15/02 |
| DE | 102009031838 A1 * | 1/2011 | ............. B62D 27/02 |
| DE | 102009048398 A1 * | 4/2011 | ............. F16B 19/00 |
| DE | 102011114306 A1 * | 3/2013 | ............. F16B 5/04 |
| DE | 102012018228 A1 * | 3/2013 | ............. F16B 5/04 |
| EP | 2 039 947 A2 | 3/2009 | |
| EP | 1 926 918 B1 | 7/2009 | |
| GB | 2 048 417 A | 12/1980 | |
| GB | 2 244 318 A | 11/1991 | |
| JP | 08004732 A * | 1/1996 | |
| JP | 11-270523 | 10/1999 | |
| JP | 2005-069451 | 3/2005 | |
| JP | 2005-233413 | 9/2005 | |
| JP | 2006-234154 | 9/2006 | |
| JP | 2007-229980 | 9/2007 | |
| JP | 2001-124033 | 5/2011 | |
| WO | WO 2008/125312 A1 | 10/2008 | |
| WO | WO 2009/010165 A2 | 1/2009 | |

OTHER PUBLICATIONS

German Office Action for German Application No. DE 10 2009 048 398.5-24; Jul. 21, 2010; 4 pgs.).
English Translation of the International Preliminary Report on Patentability; Apr. 12, 2012; 4 pgs.).
Chinese Office Action and Search Report for CN 201080052191.6; dated Dec. 24, 2013; 6 pages.
European Notice of Opposition for EP 10765581.3; dated Oct. 21, 2016; 3 pages.

* cited by examiner ived against
CONNECTION BETWEEN TWO COMPONENTS MADE OF REINFORCED PLASTIC AND METHOD FOR THE PRODUCTION THEREOF

FIELD OF THE INVENTION

The present invention relates to connections of components using a self-piercing connection element, of which at least one component is comprised of reinforced plastic. The invention further relates to a method for producing such connections.

BACKGROUND OF THE INVENTION

Different methods and connections are known from the prior art for connecting together for example, two components comprised of reinforced plastic by means of a threadless fastening element. Such connections are used in the aircraft industry, and increasingly in the automobile industry. The components are comprised of glass fiber or carbon fiber reinforced plastic, for example. An example from the aircraft industry is described in the document U.S. Pat. No. 6,499,926.

In the aircraft industry, the two components that are comprised of carbon fiber reinforced plastic (CRP), are initially pre-drilled. One method of pre-drilling that is gentle on the material, but costly, is jet drilling. For connecting the two components, the holes must then be aligned over one another, and the components must be pretensioned against each other in order to avoid slipping while producing the connection. Then, a blind rivet or a similar connection element is placed in the hole and subsequently fastened. When forming the closing head at the connecting blind rivet, mechanical stresses develop at the boundary surfaces between the component and the blind rivet. These mechanical stresses create cracks and support the growth thereof, as they cannot relax in the rigid plastic component. Furthermore, the cost for producing the connection is increased in that the blind rivet is wet, that is, the rivet is embedded in adhesive, or is shored with sleeves. In this manner, corrosion at the borders of the hole for the connection element is intended to be reduced.

The document DE 20 2005 015 713 describes a hollow self-punching fastener which is inserted in only one plastic component. After the punching procedure, the projecting edge of the fastener is flattened down, in order to fix the edge to the component. Because the flattening is associated with a radial expansion of the fastener about its longitudinal axis, crack-forming mechanical stresses are generated in the component. Depending on the degree of the expansion of the fastener, these crack-forming stresses also act on the interior of the component, that is, in the through-thickness direction thereof, so that cracks could be generated there too.

Therefore, starting from the prior art discussed above, the object of the present invention is to provide an economical and reliable connection between components comprised of reinforced plastic and a method for the production thereof.

SUMMARY OF THE INVENTION

The named objective is solved by a connection comprised of at least two components according to independent claim 1, and by a method for connecting at least a first component and a second component, not pre-punched, composed of reinforced plastic by a self-piercing connection element with a head and a shaft according to independent claim 9. Advantageous designs and further developments of the present invention arise from the following description, the accompanying drawings and the dependent claims.

The connection according to the invention comprising at least two components has the following features: a first component and a second component, of which at least the second component is comprised of reinforced plastic, a self-piercing connection element with a head and a shaft, the head thereof being supported on the first component and the shaft thereof passes completely through the first and the second component, and a disc-shaped counter bearing to which the shaft is fastened such that the at least two components are fastened between the head and the counter bearing.

Such connections are preferably created in components in which the first, or several, components are comprised of reinforced plastic with a strength of more than 300 MPa, preferably more than 600 MPa. Examples of such reinforced plastics are: glass fiber, carbon fiber, fiber or mat reinforced plastics, to name a few. It is also conceivable to use further plastics of different material compositions that attain the above named strength ranges. Currently, carbon fiber reinforced plastic (CRP) is used preferably as a component material. For producing the connection, the self-piercing connection element, with head and shaft, is inserted into the first and second component. In order to reliably connect the two components together, the shaft of the connection element, which completely penetrates through the components to be connected, is anchored to the disc-shaped counter bearing. Due to this construction, the components between the head of the connection element and the disc-shaped counter bearing are held in a force-locking and form-locking manner. The disc-shaped counter bearing also ensures that the tensile stresses acting in the axial direction of the shaft are distributed over the surface of the counter bearing, and are then introduced into the adjacent second component. This reduces stress concentrations adjacent to the shaft of the connection element.

Preferably, the second component, or the first and the second component, are comprised of carbon fiber reinforced plastic. According to a further preferred design of the present invention, the second, or the first and the second, component are not pre-punched components for the shaft of the connection element.

The present connection is created in at least one component comprised of reinforced plastic that is not pre-punched for the shaft of the connection element. While producing the connection, the connection element itself creates the hole at least in the second component, preferably by a self-cutting or stamping or displacing-penetrating process. This simplifies the production of the connection, and makes the present connection more economical in comparison to the prior art. Additionally, is not necessary to refinish the inner surface of a bore hole in the component, for example by polishing, which reduces crack formation or possible corrosion.

According to a further preferred design of the present invention, the disc-shaped counter bearing is a disc comprised of a ductile material with, or without, a hole for receiving the shaft of the connection element. A disc with, or without, a hole is used in the connection depending on how the self-piercing connection element is constructed. The disc-shaped counter bearing fulfills the function of an omitted die plate during the production of the connection, because during the production of the connection and in the present connection, the counter bearing serves for support and distribution of mechanical stress into the second component adjacent to the counter bearing. If a counter bearing with a hole is used, the hole is disposed beneath the shaft, and the circumference of the hole, or the diameter thereof, matches the circumference of the shaft of the connection element, or the diameter thereof. It is also conceivable that the shaft enlarges the hole in the counter bearing during the production of the connection such that it is present with a precise fit in relation to the shaft of the connection element. In the same manner, however, it is also preferred that the shaft of the connection element completely penetrates the counter bearing during the production of the connection, and is fixed in this manner, or subsequently, to the counter bearing.

According to a further design of the present invention, the disc-shaped counter bearing contacts the second component with a surface, which corresponds in shape and areal extent to the head of the connection element. If the connection element is equipped, for example with a round head of a specific circumference, then preferably a disc-shaped counter bearing is used that has a similar round shape and nearly the same circumference or diameter as that of the head of the connection element. If the head and counter bearing are disposed opposite each other, this provides better clamping of the components to be connected together between the head and a counter bearing. Furthermore, the mechanical clamping stresses between the head and the counter bearing are uniformly introduced into the component to be connected. It is also conceivable to form head and counter bearing in different sizes and shapes.

According to a further preferred embodiment of the present invention, the first and second component are comprised of carbon fiber reinforced plastic (CRP) and are not pre-punched, and the shaft of the connection element is at least partly hollow in the axial direction, and at the counter bearing is widened radially outward with respect to the longitudinal axis of the shaft, particularly flattened out.

In addition it is preferable that the self-piercing connection element has a shaft that is at least partly hollow with a circumferentially disposed cutting edge at the front side facing away from head, or is a solid punch rivet, or is a bolt with a shaft tapering at the font side facing away from the head.

In addition, the present invention comprises a method for connecting at least a first component and a second component, not pre-punched, comprised of reinforced plastic, by means of a self-piercing connection element with a head and a shaft. The method has the following steps: a) disposing the first and second component on top of each other, b) pretensioning the first and second components against a disc-shaped counter bearing, c) placing the connection element such that the shaft completely passes through the first and the second component, wherein the disc-shaped counter bearing acts as a die plate, and d) fixing the shaft at the counter bearing so that the first and the second component are held between a head of the connection element and the counter bearing.

According to a preferred embodiment of the method, the first and second component are comprised of carbon fiber reinforced plastic, that is not pre-punched. The self-piercing connection element has a shaft that is at least partly hollow with a circumferentially disposed cutting edge at the face side facing away from the head. In a further design of step c) of the above described method, the connection element cuts through, or punches through, the connection element, and in step d) the shaft at its side facing away from the head is widened radially at the counter bearing, in particular flattened out.

According to a further preferred method alternative, the connection element is a solid punch rivet, where in step c) the components and the counter bearing are punched through, and in step d) the counter bearing is embossed, so that the material of the counter bearing is displaced into a circumferentially disposed groove at the shaft of the solid punch rivet, such that a form-locking and/or force-locking connection arises between the counter bearing in the shaft.

According to a further preferred embodiment of the method according to the invention, the connection element is a bolt with a tapered shaft. The counter bearing is preferably a closed disc, or a disc with a hole, that has a diameter which is less than the diameter of the shaft of the connection element. And a further design of step c) of the above method, the bolt is set with a speed of the least 5 m/s, preferably at least 10 m/s. Here, the components and the counter bearing are penetrated such that during the placement, the shaft of the bolt is fixed in the counter bearing.

DESCRIPTION OF THE ACCOMPANYING DRAWINGS

Figure 2:
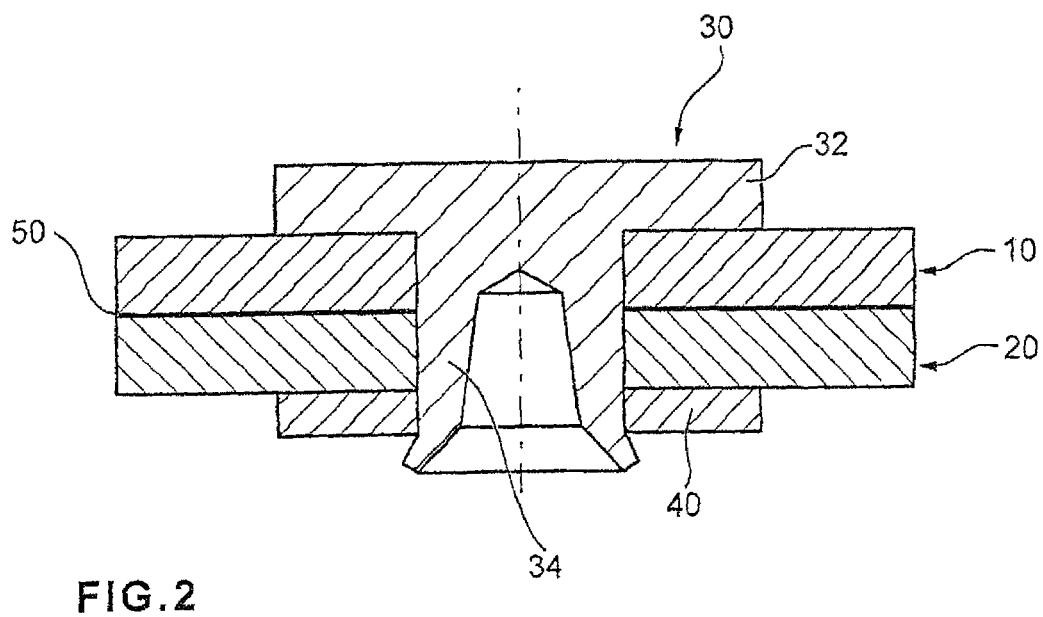
Figure 3:
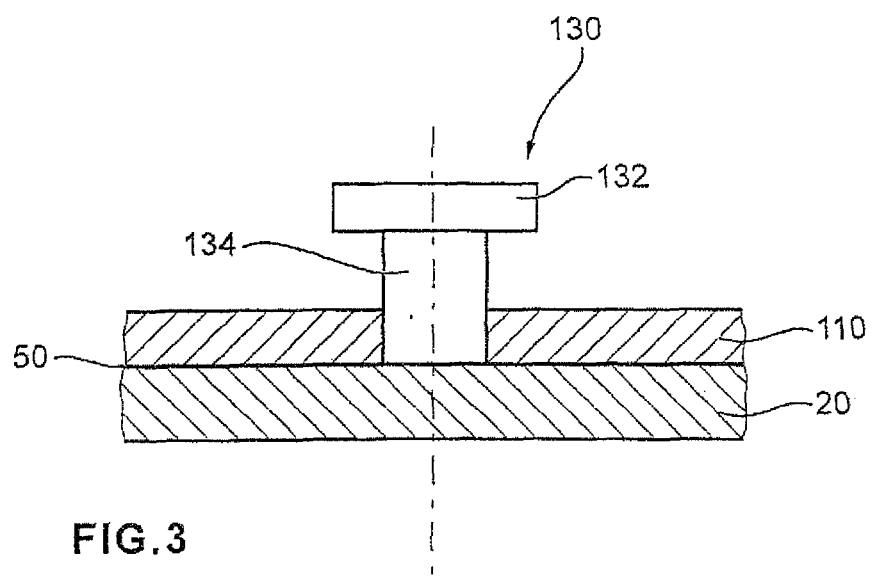
Figure 4:
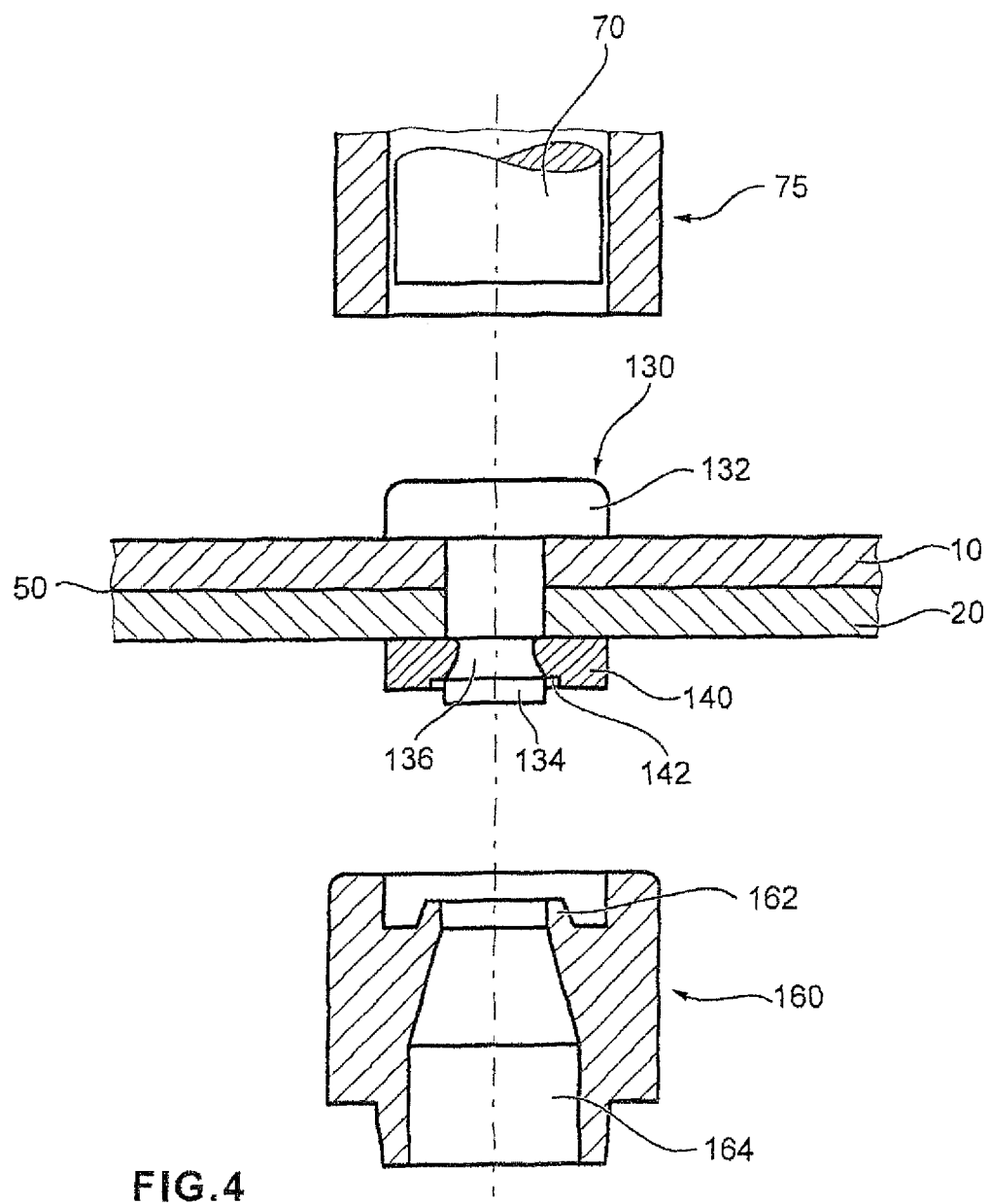
Figure 5:
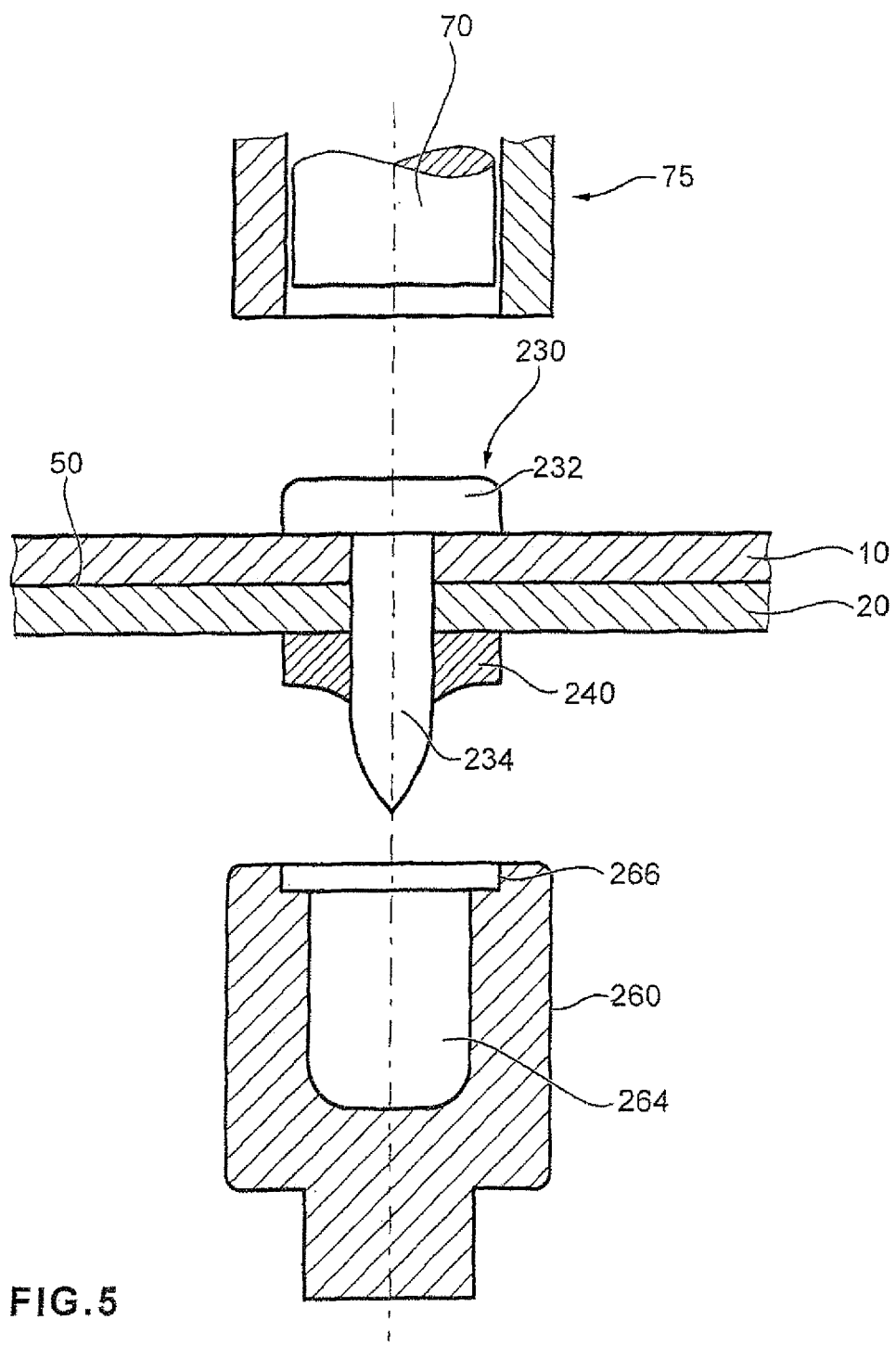
Figure 6:
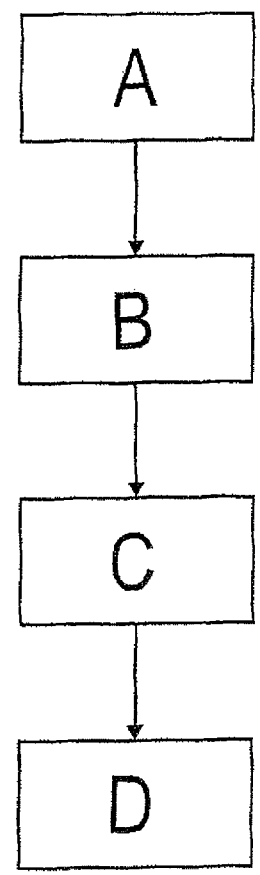

Preferred embodiments of the present invention are explained in more detail in reference to the accompanying drawings. They show:

FIG. 1 a schematic exploded representation of the individual parts of the connection according to the invention, and device for producing this connection according to a first embodiment, FIG. 2 the connection according to the first preferred embodiment, FIG. 3 a schematic representation of a preferred starting position for producing the invention, FIG. 4 a schematic representation of a further preferred embodiment of the invention, and the device used for the production thereof, FIG. 5 a schematic representation of a further preferred embodiment of the invention and the device used for the production thereof, and FIG. 6 a flow diagram for illustrating an embodiment of the method according to the invention.

DETAILED DESCRIPTION OF THE PREFERRED EMBODIMENTS OF THE PRESENT INVENTION

The present invention comprises a connection of least two components 10; 110, 20, as shown according to different embodiments in the FIGS. 2, 4 and 5. At least one component 10; 110, 20 is comprised of reinforced plastic, whereas preferably at least two components 10, 20 comprised of reinforced plastic are connected together. The group of reinforced plastics comprises plastics with a strength of at least 300 MPa, preferably of at least 600 MPa. Among these plastics are preferably glass fiber, carbon fiber, fiber and mat reinforced plastics, for instance CRP, to name a few.

It is also preferred that the first component 10, 110 is produced from high-strength steel or a different material, for instance stainless steel, than the second component 20 which is comprised of reinforced plastic. According to the preferred embodiment shown in FIG. 3, the first component 110 is also pre-punched, if it is produced from ultra-high-strength steel for example, with a strength of at least 800 MPa.

If the components 10, 20 are comprised of reinforced plastic, they are not pre-punched according to a further embodiment of the present invention in order to accept a shaft 34; 134; 234 of a self-piercing connection element 30; 130; 230 that preferably has no threads on the exterior thereof. The self-piercing connection element 30; 31; 230 comprises in addition a head 32; 132; 232, in order to support a first component 10; 110; 210 in the connection or to rest thereupon. The designs used in the connections shown in the FIGS. 2, 4 and 5 are preferred as a self-piercing connection element 30; 130; 230 that preferably has no threads on the exterior.

According to FIG. 2, the connection element 30 in the connection shown comprises a shaft 34 that is at least partly hollow, in the axial direction thereof, and that extends through the components 10, 20. In addition a circumferentially disposed cutting edge (not shown) is provided on the face side of the shaft 34 facing away from the head 32. The connection element 30 in FIG. 1, is described in detail in the documents EP 2 039 947 and US 2009/070983, which are hereby incorporated in full by reference. The connection element 30 is additionally preferably comprised of a corrosion-resistant material that interacts only negligibly, or not at all, with the reinforced plastic. If the connection element 30 is inserted in components 10, 20 comprised of CRP, then according to a preferred embodiment of the present invention, the element is comprised of stainless steel.

A solid punch rivet 130 according to FIG. 4 represents a further preferred embodiment of the connection element of the connection according to the invention. The solid punch rivet 130 comprises a head 132 abutting on a first component 10. After the connection is produced, a shaft 134 that is connected to the head 132, extends completely through the components 10, 20, that are preferably not pre-punched. A circumferential, preformed groove 136 is disposed in the shaft 134 adjacent to the face side of the shaft 134 facing away from the head end 32. During connection of the components 10, 20, the groove 136 accommodates material displaced from a disc-shaped counter bearing 140. The material is displaced into the groove 136 during an embossing of the counter bearing 140, such that a form-locking and/or force-locking connection is formed between the shaft 134 and the counter bearing 140. For this reason, the counter bearing 140 is preferably comprised of a ductile metal, such as aluminum, steel, stainless steel or titanium. The solid punch rivet is preferably comprised of hardened steel, stainless steel or titanium.

According to a third preferred embodiment, which is shown in FIG. 5, the connection of the components 10, 20 comprises a reinforced plastic bolt 230 as a connection element. The bolt 230 has a head 332 that is connected to a tapered shaft 234. The bolt 230 is also preferably inserted into components 10, 20 that are not pre-drilled, so that the shaft 234 thereof completely passes through the components 10, 20 in the connection. Constructive details of the bolt 230 are explained in more detail in the documents EP 1 926 918 or WO 2008/125 312 or WO 2009/010 165 which are hereby incorporated in full by reference.

The self-piercing connection element 30; 130; 230 in the connection is connected to the disc-shaped counter bearing 40; 140; 240, already discussed above. The counter bearing 40; 140; 240 is comprised of a solid material such that a sufficient fastening of the shaft 34; 134; 234 to the counter bearing is guaranteed in the connection. In the embodiment in the FIGS. 2, 4 and 5, a suitable material is, among others, a ductile metal, such as aluminum, steel, titanium or stainless steel. In the embodiment in FIG. 4, the material is selected so that embossing of the counter bearing 140 can occur, and with it a deformation. Therefore, here too, the counter bearing 140 is preferably comprised of aluminum, steel, titanium or stainless steel, or other materials that can provide a similar clamping torque.

In the embodiment of FIGS. 4 and 5, preferably a solid counter bearing 140; 240 is used, that is, a counter bearing that does not have a center hole. It is also preferable to use a pre-drilled counter bearing 140; 240. In the embodiment of FIG. 5, the material of the counter bearing 240 must be selected such that after joining the bolt 230, sufficient mechanical radial stress fastens the counter bearing 240 at the shaft 234. Therefore, the counter bearing 240 is preferably comprised of aluminum, steel, titanium or stainless steel, or material that provide a similar clamping torque.

As seen in the connections in the FIGS. 2, 4, and 5, the counter bearing 40; 140; 240 in the outer shape, size and areal extension thereof, is matched to the shape and size of the head 32; 132; 232. In addition, the counter bearing 40; 140; 240 is preferably disposed opposite the head 32; 132; 232 in order to advantageously attain mechanical stress distribution in the components 10, 20; 110, 120 of the connection. Furthermore, the counter bearing 40; 140; 240 preferably implements the function of a closing head, which is known from punch rivet connections composed of metal. Whereas with conventional punch rivet connections, the closing head is formed only by the deformed rivet shaft, the counter bearing 40; 140; 240 used here yields a closing head with a larger surface area abutting on the second component 20. This increases the strength of the connection produced.

According to a further embodiment of the connection according to the invention, a disc spring is used as the counter bearing 40; 140; 240. During production of the connection, the disc spring (not shown) used as a counter bearing 40; 140; 240 is pretensioned against the second component 20 by the relative movement of the punch 70 and die 60; 160; 260 toward each other. In this position, and with this mechanical pretensioned deflection, the counter bearing 40; 140; 240 is then fastened to the shaft 34; 134; 234. Thus, the disc spring as a counter bearing 40; 140; 240 introduces a mechanical clamping component supporting the connection, which compresses the components 10; 110, 20 between the head 32; 132; 232 and counter bearing 40; 140; 240.

For producing the connection according to the embodiment in FIG. 2, two components 10, 20 that are not pre-drilled are disposed over one another (step A in FIG. 6). It is also preferred to use a pre-drilled component 10 and a component 20 that is not pre-drilled. According to this embodiment, the components 10, 20 are comprised of carbon fiber reinforced plastic (CRP).

After being placed (step A), the two components 10, 20 are pretensioned against the disc-shaped counter bearing 40 (step B). For this purpose, the counter bearing 40 is supported on a die 60 with an open inner channel 64 (compare to FIG. 1). The components 10, 20 are pretensioned by a hold-down clamp 75 at the top punch 70 or by a separate pretensioning apparatus (not shown).

After being placed (step A) and pretensioned (step B), the top punch 70 is moved in the direction of the components 10, 20 (see arrow in FIG. 1) and sets the connection element 30 (step C). In this setting process, the cutting edge (not shown) on the face side of the shaft 34 facing away from the head, cuts holes in the components 10, so that the shaft 34 completely passes through the components 10, 20. The waste pieces that are punched or cut out from the components 10, 20 fall into the channel 64 of the die 60, and are removed therefrom.

The counter bearing 40 preferably has a central opening, that before setting (step C) is disposed centrally beneath the shaft 34. The diameter of the opening is smaller than the diameter of the cutting edge on the shaft 34. Due to this geometry, during the setting (step C), a ring is cut out from the counter bearing 40 in order to adapt the center opening of the counter bearing 40 to the circumference of the shaft. It is also preferred that the counter bearing 40 is formed with, or without, a hole matched to the shaft 34.

When the setting process is completed, the head 32 abuts the component 10 and is held by the top punch 70. Now, a counter punch (not shown) moves through the channel 64 widening the shaft 34 that is at least partly hollow, radially outward, preferably flattening it out. In this manner, the shaft 34 is fastened at the counter bearing 40 (step D), and the connection of FIG. 2 is produced.

According to the embodiment shown in FIG. 4, the solid punch rivet 130 is set in the two components 10, 20, and connected to the counter bearing 140. Before placing (step A) and pretensioning (step B), the counter bearing 140 is positioned at least partly in the die 160. It rests on an annular projection 162, which is limited radially outward by recesses and radially inward by the inner channel 164 of the die 160 (see lateral sectional view in FIG. 4). The counter bearing 140 is so thick that it extends beyond the die 160 in the direction of the component 20. Due to this placement, the counter bearing 140 cannot slip after positioning in the die 160. After the counter bearing 140 has been positioned, the components 10, 20 are disposed over one another on the die 160 with the counter bearing 140 (step A).

After placing (step A) and pretensioning (step B) with the hold-down clamp 75 or a pretensioning device, not shown, a solid punch rivet 130 is placed through the components 10, 20 (step C). The components 10, 20 and counter bearing 140 are preferably not pre-drilled so that the components 10, 20 and the counter bearing 140 are punched through during setting (step C). This results in three waste pieces, that are removed via the inner channel 164 and a die 160.

Furthermore, due to the movement of the top punch 70 during the setting (step C), the counter bearing 140 presses against the annular projection 162 and is embossed. During embossing, the annular projection 162 penetrates into the counter bearing 140 and displaces material from the counter bearing 140 into the groove 136. Due to the displacement of this material, a form-locking and/or force-locking connection develops between the counter bearing 40 and the shaft 134. The counter bearing 40 is fastened (step D) to the connection element 130 in this manner.

In the third embodiment according to FIG. 5, the counter bearing 240 is positioned on the die 260. For this purpose, the die 260 comprises a circumferential recess 266 above a cavity 264. The cavity 264 serves for receiving the shaft 234 of the bolt 230 during the setting (step C). (compare the lateral sectional view in FIG. 5)

After placing (step A) and pretensioning (step B) of the components 10, 20 (see above), the bolt 230 is set with a speed of at least 5 m/s, preferably at least 10 m/s.

The bolt 230 is driven using the top punch 70. Preferably, neither the components 10, 20 nor the counter bearing 240 are pre-drilled. During the setting (step C), the bolt 230 penetrates through the components 10, 20 and the counter bearing 240. During this setting procedure, the die 260 correspondingly supports the components 10, with counter bearing 240. In the same manner, according to a further alternative method, a counter bearing with a hole is used.

After setting (step C), the shaft 234 is held in the counter bearing 240 by radially inward directed compression stresses, so that already during the setting (step C), the shaft 234, is fastened (step D) in the counter bearing 240.

For supporting the connection of the components 10, 20 and 110, 20, an adhesive layer 50 is also preferred between the components 10, 20 and 110, 20. This adhesive layer 50 is applied on one of the components 10, 110, 20 before placing the components 10, 20 and 110, 20. In this manner, the adhesive layer 50 implements a pre-fastening of the components 10, 110, 20 until the complete curing of the adhesive. In addition, the adhesive layer 50 in the respective connection contributes to the structural reinforcement of the connection. In a connection produced in the motor vehicle, this leads to higher stability of the connection, for example, in the case of a motor vehicle collision. Thus, there is an adhesive layer 50 present between the components 10, 20 and 110, 20 in the connections according to the different embodiments of the present invention discussed above.

The invention claimed is:

1. A combination for connecting at least two components, said combination comprising:
    a) a first component and a second component, in which at least the second component is comprised of a reinforced plastic;
    b) a self-piercing connection element with a head and a shaft, the connection element being a solid punch rivet, wherein a circumferential preformed groove is disposed in the shaft adjacent to a face side of the shaft facing away from a head end of the shaft;
    c) the head of the self-piercing connection element being supported on the first component, and the shaft thereof completely passing through the first and second components and a one-piece disc-shaped counter bearing, wherein
    d) the groove of the self-piercing connection element accommodates material displaced from the disc-shaped counter bearing during an embossing of the disc-shaped counter bearing so that the shaft of the self-piercing connection element is fastened to the disc-shaped counter bearing and the first and second components are fastened between the head and the disc-shaped counter bearing.

2. The combination according to claim 1, in which at least one of the second component, and the first component and the second component, are comprised of reinforced plastic with a strength of more than 300 MPa.

3. The combination according to claim 1, in which at least one of the second component, and the first component and the second component, are comprised of carbon fiber reinforced plastic.

4. The combination according to claim 1, in which the disc-shaped counter bearing is a disc comprised of a ductile material, without a hole for receiving the shaft of the self-piercing connection element.

5. The combination according to claim 4, in which the disc-shaped counter bearing abuts with a surface on the second component that corresponds in shape and areal extent to the head of the self-piercing connection element.

6. The combination according to claim 1, further comprising an adhesive layer between the first component and the second component.

7. The combination according to claim 1, in which the disc-shaped counter bearing is a disc comprised of a ductile material, with a hole for receiving the shaft of the self-piercing connection element.

* * * * *